June 12, 1923.
H. C. MILLER
SEPARATING SOLIDS FROM LIQUIDS
Filed Nov. 6, 1922
1,458,234
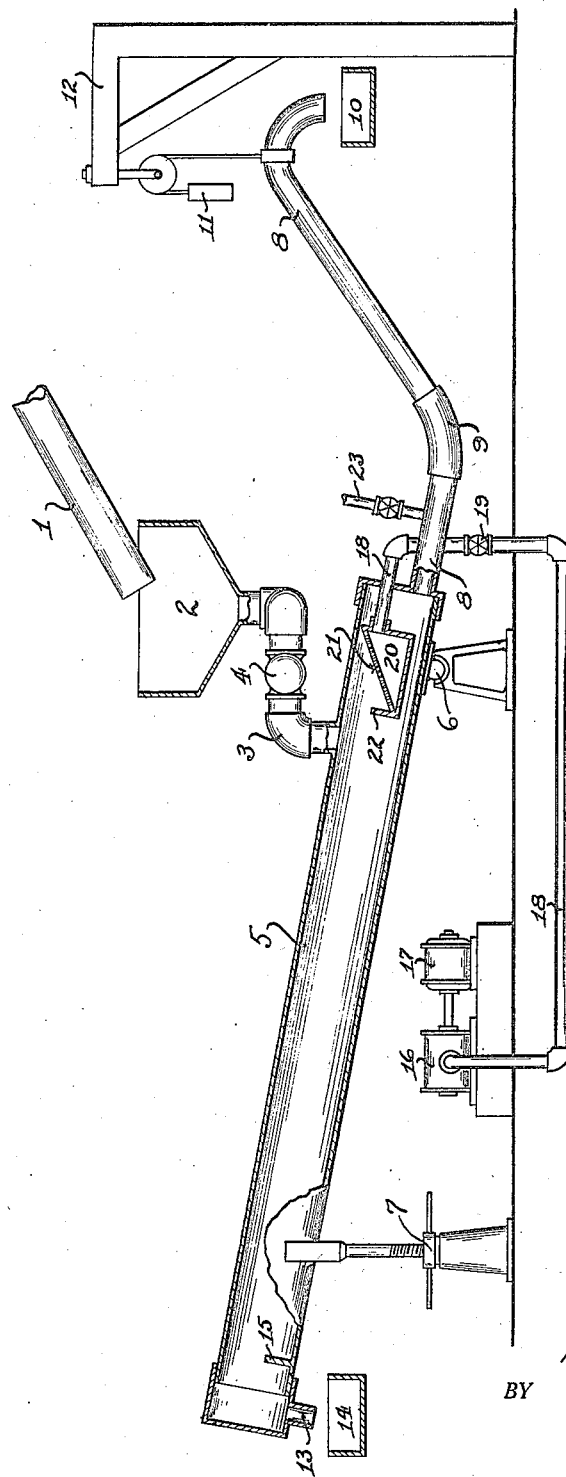
INVENTOR.
Harold C. Miller
BY Booth & Booth,
ATTORNEYS.

Patented June 12, 1923.

1,458,234

UNITED STATES PATENT OFFICE.

HAROLD C. MILLER, OF BAKERSFIELD, CALIFORNIA, ASSIGNOR TO STANDARD OIL COMPANY, OF SAN FRANCISCO, CALIFORNIA, A CORPORATION OF CALIFORNIA.

SEPARATING SOLIDS FROM LIQUIDS.

Application filed November 6, 1922. Serial No. 599,450.

*To all whom it may concern:*

Be it known that I, HAROLD C. MILLER, a citizen of the United States, residing at Bakersfield, in the county of Kern and State of California, have invented certain new and useful Improvements in Separating Solids from Liquids, of which the following is a specification.

My invention relates to the separating art, and particularly to a separation dependent upon a difference in specific gravity and solidity existing between the components of the aggregate.

My invention is especially adapted for the separation of solid matter from liquids, and is particularly intended for the separation of sand, minerals and other heavy particles and cuttings from mud-laden water, slimes and other liquids, especially from the mud-laden water used in drilling wells, to the end that the water may be re-used, in which latter connection, for the sake of example, I shall herein describe it.

In the drilling of wells it is customary to pump mud-laden water down through the drilling device into the bottom of the hole, to remove from the drilling bit the sand and rock cuttings torn off by the bit, the mud-laden water with the sand and cuttings and other heavy components returning to the surface outside the drilling mechanism. This laden liquid is, at the surface, relieved of its solid particles and the mud-liquid is returned to the drilling stem.

It is the object of my invention to effect this separation in a simple and efficient manner, and to this end my invention consists in the novel method and apparatus which I shall now fully describe by reference to the accompanying drawings in which the figure is an elevation, sectioned and broken in parts, of said apparatus.

1 is a pipe which leads from the source of supply of the aggregate to be separated, say, for example, the mud-water containing the sand, cuttings, etc., from the well being drilled.

2 is a hopper into which the supply pipe 1 discharges, said hopper having the outlet 3 provided with a check valve 4.

5 is the member in which the separation is effected. It consists of an elongated vessel inclosing what may be termed an attenuated, confined chamber. This separating vessel is mounted at an angle to the horizontal and is supported upon a trunnion 6 and a jack 7, by means of which the angle of said vessel may be varied and adjusted to suit. The outlet 3 of the hopper 2 leads into the separating vessel 5 near its lower end.

Leading from the lower cross sectional area of the lower end of the separating vessel 5 is a discharge pipe 8, having a flexible joint or section 9, so that the delivery end of said pipe which discharges into a launder 10, may be raised or lowered at will, which adjustment is assisted by a counterbalance connection 11, carried by a frame 12.

The separating vessel 5 has at its upper end an outlet 13 which delivers into a launder 14, and within the vessel adjacent to and in advance of the outlet 13 is a baffle plate 15 to assist in cleaning the overflow of sand and other heavy particles.

16 is an air-compressor or blower driven by a motor 17. From the air compressor a pipe 18, with a control valve 19, leads into the lower end of the separating vessel 5, and is fitted with a nozzle 20, lying within the vessel. This nozzle is formed with a foraminous discharge face 21 lying at an angle to and directed towards the upper cross sectional area of the separating vessel, and at its lower end it is fitted with an uprising directing baffle 22. At 23 is indicated a clean-out connection in the discharge pipe 8.

The method carried out in the apparatus is as follows:—The mud-laden liquid containing sand, cuttings, and other solids is continuously delivered from the pipe 1 into the hopper 2, from which by gravity it flows through the hopper outlet 3 into and fills the separating vessel 5 to its capacity. Air under pressure slightly higher than that of the static head of the mud-liquid in the vessel 5, is supplied to said vessel through the pipe 18 from the compressor 16, the air entering said vessel in numerous jets through the perforated face 21 of the nozzle 20, and rising vertically directly from said face in a plurality of relatively small bubbles. These in rising combine into successive large bubbles which follow each other at intervals, and this succession or procession of large bubbles then proceeds up the incline of the separating vessel in the upper cross sectional area thereof, each bubble assuming a shape resembling the letter V with its base foremost. As they proceed towards the upper end of the separating vessel the mud laden liquid is rolled about them, as it were, being forced to move down and back and around the apex of the bubble and up again over it. This occurs many times before a bubble finally reaches the outlet at the upper end of the separating vessel, and it is this rolling action, accompanied by the pulsating effect of the procession of bubbles that forces the sand and heavier particles to drop into the lower cross sectional area of the vessel. Pulsating currents are thus built up causing a concentration of the heavier particles, which migrate towards the lower end of the separating vessel by gravity, while the cleaned mud liquid flows over the baffle 15 at the upper end of the vessel and out through the outlet 13, and is then ready to be re-circulated through the well. The concentrated heavier particles together with some liquid pass out from the lower end of the separating vessel through the pipe 8, and by raising or lowering the end of this pipe, the amount of liquid discharged with the heavier particles can be regulated. In this apparatus there are no moving parts and the rates of flow, percentage of cuts and the like can be entirely governed by the size of the equipment, pressure and volume of the air, the angularity of the separating vessel and the vertical adjustment of the discharge pipe 8.

I claim:—

1. An apparatus for separating solids from liquids comprising an inclined separating pipe-like vessel having an outlet at each end; means for continuously supplying said vessel to its capacity with the aggregate to be separated; means for controlling the discharge from the lower end of said vessel; and means for introducing a plurality of jets of air into the lower end of said vessel.

2. The method of separating solids from liquids comprising continuously supplying the aggregate to an inclined confined chamber to its capacity; continuously introducing air into the lower end of the chamber in such wise as to form a procession of air bubbles traveling in the upper cross sectional area of the chamber towards the upper end thereof, whereby a succession of pulsating currents are created tending to settle the solid components; continuously delivering the greater volume of the liquid from the upper end of the chamber; and regulating the continuous discharge of the lesser volume of said liquid together with the solids from the lower end of said chamber.

In testimony whereof I have signed my name to this specification.

HAROLD C. MILLER.